(12) United States Patent
Onggosanusi et al.

(10) Patent No.: US 7,565,111 B2
(45) Date of Patent: Jul. 21, 2009

(54) SINGLE-ANTENNA INTERFERENCE CANCELLATION RECEIVER IN TIME SLOT COMMUNICATION SYSTEM

(75) Inventors: Eko Onggosanusi, Allen, TX (US);
Anand Dabak, Plano, TX (US);
Timothy Schmidl, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 267 days.

(21) Appl. No.: 10/967,605

(22) Filed: Oct. 18, 2004

(65) Prior Publication Data

US 2005/0201493 A1    Sep. 15, 2005

Related U.S. Application Data

(60) Provisional application No. 60/548,662, filed on Feb. 26, 2004.

(51) Int. Cl.
*H04B 1/00* (2006.01)
(52) U.S. Cl. .................. 455/63.1; 455/67.13; 455/296; 375/346
(58) Field of Classification Search .............. 455/63.1, 455/65, 67.13, 296; 375/341, 343, 346–350
See application file for complete search history.

(56) References Cited

U.S. PATENT DOCUMENTS

| 6,483,821 B1 | 11/2002 | Dabak et al. | |
| 6,944,245 B2 * | 9/2005 | Stewart et al. | 375/350 |
| 7,187,736 B2 * | 3/2007 | Buckley et al. | 375/350 |
| 7,218,894 B2 * | 5/2007 | Schmidl et al. | 455/67.11 |
| 7,308,056 B2 * | 12/2007 | Pukkila et al. | 375/348 |
| 2001/0004390 A1 * | 6/2001 | Pukkila et al. | 375/340 |
| 2004/0085917 A1 * | 5/2004 | Fitton et al. | 370/292 |

(Continued)

FOREIGN PATENT DOCUMENTS

EP    0 954 143 A1    3/1999

(Continued)

OTHER PUBLICATIONS

"Evaluation of Potential Transmit Diversity Schemes with Iterative Receivers in EDGE", Nikolai Nefedov, et al., Personal, Indoor and Mobile Radio Communications, 2002, The 13th IEEE International Symposium on Sep. 15-18, 2002, Piscataway, NJ, vol. 5, Sep. 15, 2002, pp. 2087-2091, XP010614096, ISBN: 0-7803-7589-0.

(Continued)

*Primary Examiner*—Raymond S Dean
(74) *Attorney, Agent, or Firm*—Ronald O. Neerings; Wade James Brady, III; Frederick J. Telecky, Jr.

(57) ABSTRACT

A receiver (MST) for use in a modulated communications system wherein data is communicated in a time-slotted format. The receiver comprises circuitry (22) for providing samples of a group of data from the time-slotted format and circuitry (46, 42) for determining a first set of channel estimates in response to a first set of the samples. The receiver also comprises circuitry (30) for first predicting decisions for data in the group of data in response to the first set of channel estimates and circuitry (46, 42) for determining a second set of channel estimates in response to the predicted decisions. Lastly, the circuitry for predicting is further for second predicting decisions for data in the group of data in response to the second set of channel estimates.

27 Claims, 2 Drawing Sheets

U.S. PATENT DOCUMENTS

2005/0036575 A1\* 2/2005 Kuchi et al. .............. 375/348

OTHER PUBLICATIONS

"Turbo Equalization for EDGE System with DDF-SOVA", Xiangguo Tang, et al., Conference Record of the 35th Asilomar Conference on Signals, Systems, and Computers, Pacific Grove, CA, Nov. 4-7, 2001, pp. 295-299, XP010580935, ISBN: 0-7803-7147-X, Section III.

"Single Antenna Cochannel Interference Cancellation In Asynchronous TDMA Systems", Hendrik Schoeneich, et al., Proceedings of Baiona Workshop on Signal Processing In Communications, Sep. 8, 2003, pp. 157-162, XP002290137, Sections III and IV.

"Single Antenna Interference Cancellation (SAIC) for GSM Networks", Ayman Mostafa, et al., Vehicular Technology Conference, 2003. VTC 2003-Fall. IEEE 58th Orlando, FL, Oct. 6-9, 2003, pp. 1089-1093, vol. 2, XP010700980, ISBN: 0-7803-7954-3, Section I.

\* cited by examiner

SINGLE-ANTENNA INTERFERENCE CANCELLATION RECEIVER IN TIME SLOT COMMUNICATION SYSTEM

CROSS-REFERENCES TO RELATED APPLICATION

This application claims priority under 35 U.S.C. § 119 of U.S. Provisional Application No. 60/548,662, filed Feb. 26, 2004.

STATEMENT REGARDING FEDERALLY SPONSORED RESEARCH OR DEVELOPMENT

Not Applicable.

BACKGROUND OF THE INVENTION

The present embodiments relate to electronic devices and are more particularly directed to a single-antenna interference cancellation receiver for use by way of example in a global system mobile ("GSM") communication system.

Wireless communications are very prevalent in business, personal, and other applications, and as a result the technology for such communications continues to advance in various areas. After cellular communication systems originated in the United States, one type of cellular system that then followed in Europe, and which is now finding its way into the United States as well as elsewhere, is the GSM system. By way of introduction, the following discusses certain aspects of GSM, while numerous other aspects will be known in the art. As its name suggests, GSM has become globally accepted and it provides a set of recommendations so that uniform concurrence with them permits compatible communication between different equipment in numerous geographic regions. As a cellular system, GSM is characterized by providing low-power base transceiver stations ("BTSs", or singular, "BTS"). Each such BTS communicates signals with mobile units that are within a geographic area, or "cell," reachable via wireless radio signal communications with that BTS. A single BTS may have a number of actual transceivers, typically based on the expected density of users in the cell corresponding to that BTS. A group of BTSs is often controlled by a common base station controller. The controller typically provides all the control functions and physical links between the BTS and a mobile services switching center, where the controller is a high-capacity switch that provides functions such as handover, cell configuration, and control of radio frequency power levels in BTSs.

For GSM communications, both control and traffic (i.e., speech and data) channels are digital, and GSM uses a combination of time division multiple access ("TDMA") and frequency division multiple access ("FDMA"). Particularly, for the FDMA aspect, the 25 MHz band for the link, either uplink or downlink, is divided into 124 carrier frequencies (separated by 200 kHz) and one or more of these carrier frequencies is assigned to each BTS with some level of frequency hopping. The BTS then divides each of its carrier frequencies into time slots, thereby providing the TDMA aspect. The fundamental unit of time in this TDMA scheme is called a burst or a burst period, which lasts 15/26 ms (or approximately 0.577 ms). One physical channel is one burst period per TDMA frame. Channels are defined by the number and position of their corresponding burst periods. Eight burst periods are grouped into a TDMA frame (120/26 ms, or approx. 4.615 ms), which forms the basic unit for the definition of logical channels. Further, a group of 26 TDMA frames forms a 120 ms multiframe, and that 120 ms is how the length of a burst period is defined, namely, by dividing the 120 ms by 26 frames and further dividing that result by 8 burst periods per frame. The multiframe provides a traffic channel ("TCH") that carries speech and data traffic. TCHs for the uplink and downlink are separated in time by three burst periods, so that the mobile station does not have to transmit and receive simultaneously, thus simplifying the mobile station electronics.

Mobile stations in GSM take various forms, but as introduction to the preferred embodiments described later, the present discussion focuses on single-antenna mobile units. In such a unit, circuitry receives signals from the BTS of the cell in which the mobile station is located and decodes the signals into corresponding data. In this regard, however, the mobile station also will concurrently receive interference, such as from BTSs in other cells (or, with respect to the BTS of the cell in which the mobile station is located, from that BTS's antenna's transmissions to the two 120 degree sectors in which the mobile station is not located). For purposes of assisting with signal decoding such as in implementing single-antenna interference cancellation ("SAIC"), the GSM burst includes a known sequence of data referred to as a training sequence code ("TSC"). Generally, when a mobile station receives a signal, an estimable correlation of interference may be made from the difference between the samples of the channel-corrected received TSC signal and the known TSC, where this estimate may be found by way of example as the square root of the inverse of the correlation matrix of these samples. Thus, this estimation is then used to achieve interference cancellation in the entirety of the signal, thereby permitting a certain level of performance for decoding all of the data in each burst.

While the preceding approach has proven workable in various implementations, the present inventors have recognized that the existing performance in interference cancellation and the resulting data decoding may be improved. Indeed, recently SAIC has been made quite popular in GSM standardization due to its potential in providing a significant capacity increase for high-frequency reuse GSM networks. However, such networks could be severely limited by co-channel interference. While several possible SAIC algorithms may be used, some require the interfering user information such as their presence, timing, channel estimates, and TSCs; examples of such algorithms include serial interference cancellation ("SIC") and joint maximum-likelihood sequence estimation ("JMLSE"). However, other SAIC algorithms are sometimes referred to as "blind capable" because they do not require this information and, thus, are more attractive. Thus, it is desirable to support and improve the performance of an SAIC algorithm that does not require the interfering user information, as is achieved by the preferred embodiments described below.

BRIEF SUMMARY OF THE INVENTION

In one preferred embodiment, there is a receiver for use in a modulated communications system wherein data is communicated in a time-slotted format. The receiver comprises circuitry for providing samples of a group of data from the time-slotted format and circuitry for determining a first set of channel estimates in response to a first set of the samples. The receiver also comprises circuitry for first predicting decisions for data in the group of data in response to the first set of channel estimates and circuitry for determining a second set of channel estimates in response to the predicted decisions. Lastly, the circuitry for predicting is further for second predicting decisions for data in the group of data in response to the second set of channel estimates.

Other aspects are also disclosed and claimed.

DETAILED DESCRIPTION OF THE INVENTION

Figure 1:
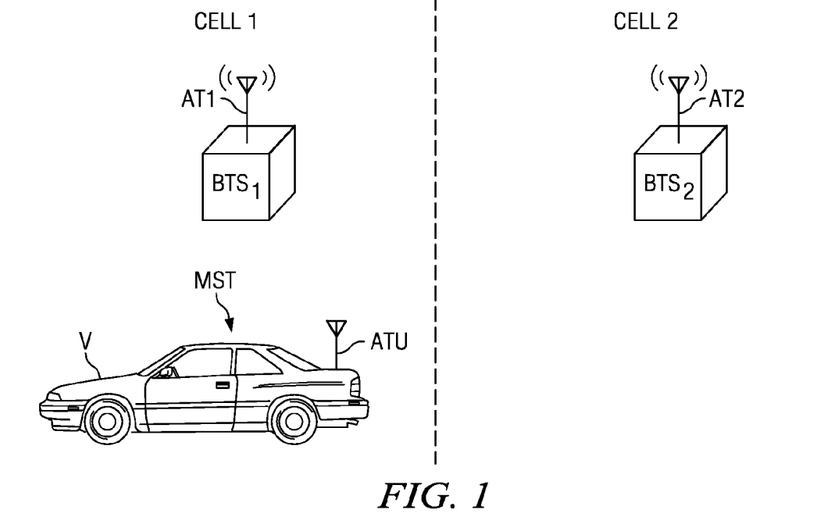
FIG. 1 illustrates a diagram of a cellular communications system 10 by way of global system for mobile ("GSM") communication system example, in which the preferred embodiments may operate.

FIG. 1 illustrates a diagram of a cellular communications system 10 that by way of example is a global system for mobile ("GSM") communication system and in which the preferred embodiments may operate. Additional details of GSM in general are provided above in the Background Of The Invention section of this document, including the time slot format of the data communications, and the reader is assumed familiar with such details. Within system 10 are shown two base transceiver stations BTS1 and BTS2. Each base transceiver station BTS1 and BTS2 is illustrated to include only a single respective antenna AT1 and AT2 for sake of the example, while it should be understood that in actuality each such station may include a larger number of antennas; in any case, each antenna is for transmitting or receiving GSM signals. In addition and as known in the art, each antenna in a GSM base transceiver station may be such that it is directional to transmit to a 120 degree sector, so that a total of three such antennas may be used to cover the entire 360 degree area surrounding the antenna. The general area of intended reach of each base transceiver station defines a corresponding cell; thus, base transceiver station BTS1 is intended to generally communicate with cellular devices within Cell 1, while base transceiver station BTS2 is intended to generally communicate with cellular devices within Cell 2.

Some overlap between the communication reach of Cells 1 and 2 exists by design to support continuous communications should a communication station move from one cell to the other. Indeed, further in this regard, system 10 also includes a user mobile station MST, which is shown in connection with a vehicle V to demonstrate that mobile station MST is intended to be moveable (i.e., mobile), while still permitting communications due to its location within a corresponding cell. In addition, by way of example mobile station MST includes a single antenna ATU for both transmitting and receiving cellular communications.

One skilled in the art also should appreciate that numerous other aspects are supported and used in system 10 but are not shown so as to simplify the present illustration and discussion. Generally with respect to such aspects, they include a base station controller that communicates with multiple base transceiver stations and further communicates with a mobile services switching center that, among other things, performs the switching of calls between user mobile stations as well as between mobile and fixed network users. In regard to the latter, the mobile services switching center also communicates with a network or networks that may communicate with fixed network users.

In some respects, system 10 may operate according to known general techniques for various types of cellular communications, including GSM communications. Such general techniques are known in the art and include the commencement of a call from mobile station MST and the handling of that call by either or both of base transceiver stations BTS1 and BTS2. Where system 10 differs from the prior art, however, is the system for, and method of, improving the decoding of signals received by mobile user station MST from each of the base station antennas in that improved performance is achieved in interference cancellation. This distinction is further detailed below in connection with FIGS. 2 and 3.

Figure 2:
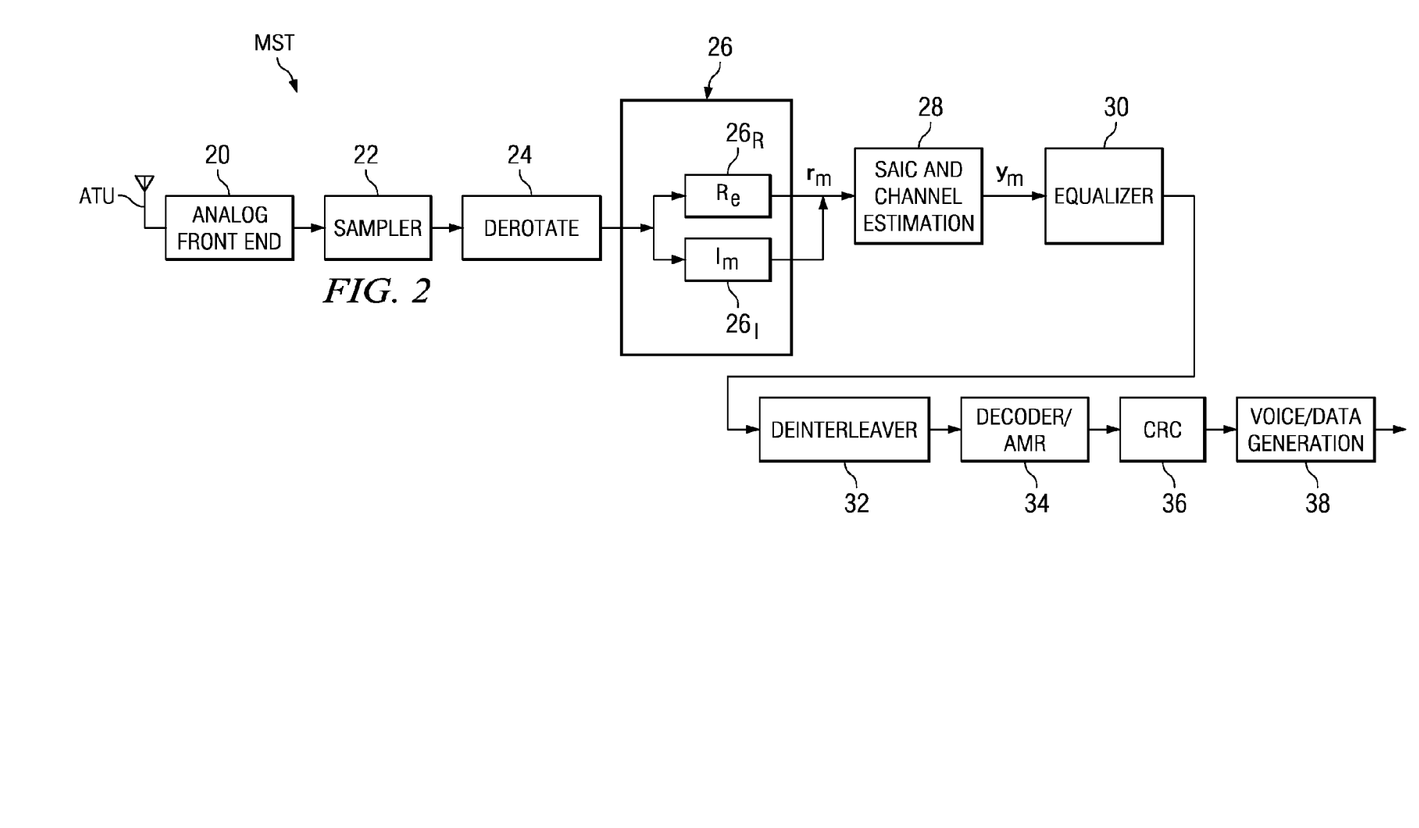
FIG. 2 illustrates a block diagram of user mobile station MST from FIG. 1.

FIG. 2 illustrates a block diagram of user mobile station MST introduced above in FIG. 1. In general, mobile station MST includes sufficient circuitry to receive and transmit data relative to a base transceiver station in the cell in which mobile station MST is located. The preferred embodiments are directed to the receiving aspect and, thus, only the receiving circuitry is illustrated and discussed so as to focus the discussion. Thus, various other circuitry may be included as is known in the relevant wireless art. Further, in various respects the blocks shown in FIG. 2 are according to the prior art, although in the preferred embodiments certain of those blocks are further improved, and therefore as is mobile station MST as a whole, as further detailed later in connection with FIG. 3.

As introduced above, user mobile station MST includes an antenna ATU for receiving communications from an antenna of a base transceiver station that is intending to transmit to mobile station MST. Of course, that same antenna ATU also will receive interfering signals, such as transmissions from other sectors of that same base transceiver station and possibly also from one or more base transceiver stations in other cells. In any event, signals received at antenna ATU are connected to an analog front end 20. According to known GSM techniques, analog front end 20 converts the radio level signals into digital lower frequency or baseband signals for further processing, as further refined according to the present inventive scope as detailed later.

The digital signals from analog front end 20 are connected to a sampler 22. In the preferred embodiment, sampler 22 samples its incoming baseband signal at a rate Q that is two times the symbol rate to thereby provide a discrete-time output. Thus, for each symbol time at sampler 22, one sample is measured on time and another is delayed by one-half of a symbol period.

In GSM, the modulation used is Gaussian Minimum Shift Keying ("GMSK"), which includes a 90 degree rotation and 1 bit per symbol in its modulation. Accordingly, the output of sampler 22 is connected to a de-rotate block 24 so that a de-rotation may be applied to the discrete time sequence. Mathematically, therefore, de-rotate block 24 multiples each sampled signal by a rotation matrix. Note also that the preferred embodiments may be applied to other modulation techniques, and in certain of such techniques de-rotation may not be necessary.

The output of de-rotate block 24, or sampler 22 if de-rotation is not required, is connected to a real/imaginary block 26, having a real determiner $26_R$ and an imaginary determiner $26_I$, for extracting a real (in-phase) and imaginary (quadrature) component, respectively, for each input sample. Thus, for each discrete (and rotated) sample provided to block 26, both a real and imaginary sample are provided. Moreover, because sampler 22 samples at Q=twice the baud rate, then block 26 provides a total of four samples, two real, and two imaginary, for each symbol period. In other words, this results in a 2Q-dimensional received signal vector, which in this document and in FIG. 2 is designated as $r_m$.

The output $r_m$ of real/imaginary block 26 is provided to a single-antenna interference cancellation ("SAIC") and channel estimation block 28. Various aspects of block 28 are detailed later in connection with the preferred embodiments. At this point and by way of introduction, the SAIC aspect of block 28 is implemented in the preferred embodiments as a spatial whitening technique, where additional details of such an approach may be found in U.S. patent application Ser. No. 10/747,461, entitled "Linear Single-Antenna Interference Cancellation Receiver," filed Dec. 29, 2003, and hereby incorporated herein by reference—in that patent, it is shown how the blind-capable SAIC algorithm is improved by providing a receiver that exploits the spectral redundancy property of a GMSK signal to provide an additional degree of freedom for linear interference suppression. The whitened signal produced by the SAIC is referred to in this document and shown in FIG. 2 as the vector $y_m$. In addition and as detailed later, the channel estimation aspect of block 28 may be implemented using a single user least squares ("SU-LS") technique or a correlation with respect to the corresponding symbols in the known training sequence code ("TSC").

The output of SAIC and channel estimation block 28 is connected to an equalizer 30. In a preferred embodiment, equalizer 30 may be a maximum likelihood sequence estimator ("MLSE") equalizer, or other types may be selected by one skilled in the art as well as an interference canceller or a matched filter if lower complexity, albeit with sacrificed performance, is desired. As an MLSE equalizer, and with a limited number of channel taps, the estimator is operable to search through alternative states across the differing taps and in response produces "soft" decisions for each symbol, meaning a prediction of the value that the data of each symbol is believed to represent. In this regard, ultimately each symbol is later decoded into a final value of −1 or +1, which is referred to in the art as a hard decision. The soft decision in contrast provides a predicted value for the symbol that is based on some type of granularity between −1 or +1.

The output of equalizer 30 is connected to a deinterleaver 32. Deinterleaver 32 operates to perform an inverse of the function of an interleaver in the base station transceiver station $BTS_x$. As known in the art, interleaving is a function that separates continuous data such that portions of it are transmitted at different times so that any negative effect on one of those portions will hopefully diminish at a different time so that the effect does not comparably and negatively affect the other portions of nearby data. For example, in GSM, a voice packet is separated and transmitted over four or eight bursts, for reasons such as protection against bursty transmission errors. In any event, therefore, deinterleaver 32 reverses the interleaving function by re-accumulating the separated portions back into a sequentially-corrected stream.

The output of deinterleaver 32 is connected to a decoder 34 or other comparable device. Decoder 34 may include a Viterbi decoder or other appropriate decoding schemes as known in the art. Alternatively, decoder 34 may be replaced with an adaptive multi-rate codec. In any event, decoder 34 further decodes the data received at its soft decision input so as to produce a corresponding hard decision output, whereby the probability of error for data input to decoder 34 is greater than that after processing and output by decoder 34.

The output of decoder 34 is connected to a cyclic redundancy check ("CRC") block 36. As known in the GSM art, before applying channel coding, the bits of a GSM speech frame are divided into multiple classes according to their function and importance. In this context, CRC block 36 evaluates the CRC accuracy of the highest class of received bits and if the CRC passes, then all three classes are presumed to be accurate. Conversely, if a failure occurs in the CRC accuracy of the highest class of received bits, then all three classes are presumed to be inaccurate. In any event, once CRC is checked and assuming it is confirmed as accurate, the bits are output to a voice/data generator 38. Voice or data is produced and can be output to the user of otherwise processed by additional circuitry in mobile station MST, although such circuitry is not shown in FIG. 2 so as to simplify the present illustration and discussion.

Figure 3:
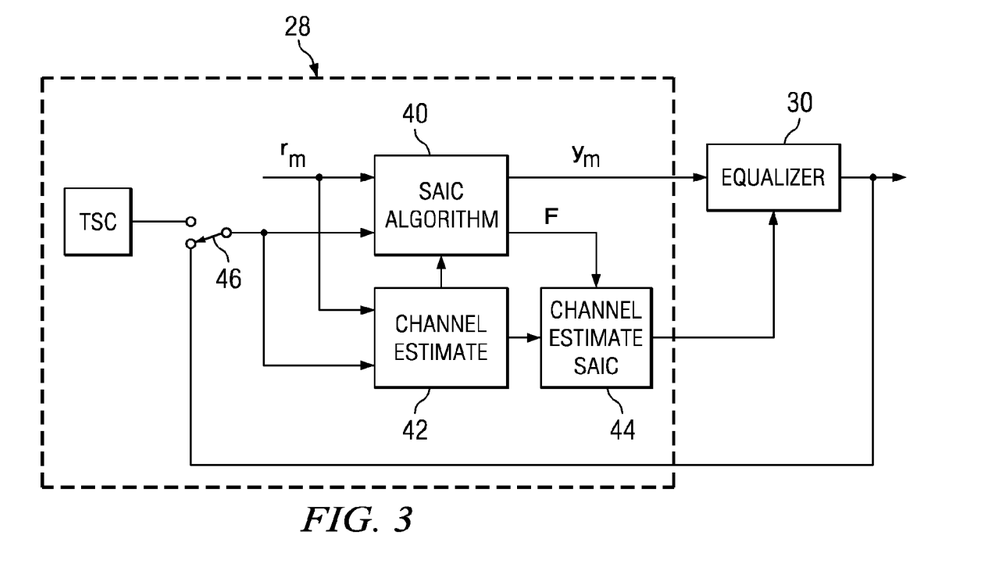
FIG. 3 illustrates a more detailed block diagram of SAIC and channel estimation block 28 from FIG. 2 and its relationship with respect to equalizer 30.

FIG. 3 illustrates a more detailed block diagram of SAIC and channel estimation block 28 from FIG. 2 and its relationship with respect to equalizer 30, all in accordance with the preferred embodiments. Looking first to the connections in FIG. 3, the real and imaginary samples vector $r_m$ is connected to an SAIC algorithm block 40 and to a channel estimator 42. The output of SAIC algorithm block 40 provides a vector $y_m$ to equalizer 30 and also a matrix signal F to a channel estimate SAIC block 44, which provides another output to equalizer 30. As detailed later, channel estimator 42 computes channel estimates and outputs them both to SAIC algorithm block 40 and to channel estimate SAIC block 44. A switch 46, shown in a functional sense and for reasons made clear later, operates in one position, which is upward in the sense of FIG. 3, to connect the known TSC to both SAIC algorithm block 40 and channel estimator 42; conversely, switch 46, in another position, which is downward in the sense of FIG. 3, operates to connect the output of equalizer 30 to both SAIC algorithm block 40 and channel estimator 42. Indeed, by way of introduction, in the preferred embodiments switch 46 is upward for one analysis of the input sample vector $r_m$ and thereafter switch 46 is downward for one or more additional iterations of analysis with respect to processing relative to that same sample vector $r_m$.

The operation of the blocks in FIG. 3 is now described, beginning with a first iteration which, as introduced above, is functionally demonstrated as occurring with switch 46 in its upward position—note, of course, that such functionality need not be achieved with a physical or mechanical element as switch 46, but switch 46 is illustrated to demonstrate a first processing step followed by later processing steps. The actual control or management of such steps may be achieved with various combinations of software and hardware as ascertainable by one skilled in the art.

With switch 46 upward, the TSC is connected to both SAIC algorithm block 40 and channel estimator 42. SAIC algorithm block 40 operates to perform a spatial whitening technique in combination with channel estimates received from channel estimator 42, as is now detailed. Channel estimator 42 determines channel estimates using a part (e.g., 16) or all (e.g., 26) of the midamble symbols of each burst in the received samples vector $r_m$, with respect to the corresponding symbols in the known TSC. In other words, in each incoming burst, the symbols that are located in the midamble positions are analyzed relative to the known TSC to estimate the effects that have been imposed on those signals by the channel of transmission between the transmitting base transceiver station BTSx and mobile station MST. The channel estimation may be achieved using an SU-LS (single user least squares) technique or, alternatively and for this first iteration, a correlation using the TSC directly is possible. There are four channel estimates for each channel tap, namely, real on-time, real delayed, imaginary on-time, and imaginary delayed. If correlation is performed, it may be done with only 16 symbols of the midamble since the TSCs in GSM were designed to have good autocorrelation properties over 16 symbols. Either a sliding window correlation along the midamble can be used, or the training sequence can be rotated while correlating with the 16 symbols of the midamble. In any event, with these channel estimates, in applying the algorithm of SAIC algorithm block 40, the last approximately 23 of the 26 midamble bits are used, since the first few bits may be corrupted by interference from unknown data bits. The actual number of midamble bits to use can be determined by the length of the channel impulse response. The remaining 23 bits are convolved with each of the four sets of channel estimates. This produces an estimate of the received midamble samples, which thereby provides a regenerated midamble that is then subtracted from the midamble samples to give the estimated interference estimation. Such interference may be caused by way of example from other base stations or from the sectors of the transmitting base transceiver station other than the sector in which mobile station MST is located. The correlation matrix of the remaining interference during the midamble is calculated as M, and it will be a 4 by 4 matrix because the real and imaginary samples are considered separately as are the on-time and delayed samples. More generally, if the oversampling factor is Q, the size of this matrix will be (2Q) by (2Q). Thus, this matrix is given by the following Equation 1, using the subscripts to indicate real (r), imaginary (i), on-time (o), and delayed (d).

$$M = \begin{bmatrix} C_{ro,ro} & C_{ro,rd} & C_{ro,jo} & C_{ro,id} \\ C_{rd,ro} & C_{rd,rd} & C_{rd,jo} & C_{rd,id} \\ C_{io,ro} & C_{io,rd} & C_{io,io} & C_{io,id} \\ C_{id,ro} & C_{id,rd} & C_{id,io} & C_{id,id} \end{bmatrix} \quad \text{Equation 1}$$

The correlation matrix, M, as shown in Equation 1, is inverted and the matrix square root is taken to form the spatial whitening matrix, F. In some implementations which use a decision feedback equalizer instead of a Viterbi equalizer, the matrix square root can be omitted. This spatial whitening matrix, F, is then applied to the samples of $r_m$ with the result being the whitened signal vector $y_m$ output to equalizer 30. In addition, note that the spatial whitening matrix, F, is also provided by SAIC algorithm block 40 to channel estimate SAIC block 44. Block 44 therefore applies the same whitening matrix to the channel estimates from block 42, so they are whitened consistent with the whitening of the $r_m$ samples (by SAIC algorithm 40), and this result also is provided to equalizer 30. As described earlier, from this information equalizer 30 may determine soft decisions about each symbol. However, as further described below, in the preferred embodiment, these soft decisions are not immediately processed with the additional functions beyond equalizer 30 as shown in FIG. 2, but instead they are further refined so as to improve overall performance. Moreover, in one preferred embodiment, equalizer 30 is instead operated to provide a hard decision for each symbol, but as demonstrated below, these hard decisions are in effect tentative in that they are refined by at least one additional iteration of processing with respect to those symbols.

Following the operations discussed above with respect to FIG. 3, switch 46 is functionally switched downward. Note, therefore, that the TSC is no longer connected to both SAIC algorithm block 40 and channel estimator 42, but instead the output of equalizer 30 is provided to those blocks. Thus, instead of inputting the 26 TSC bits, hard decisions from the output of equalizer 30 and for the entire burst are input, which includes the midamble as well as 2 flag bits immediately on either side of the midamble and 114 data bits (57 toward the beginning, 57 toward the end, symmetrically spaced about the TSC midamble and flag bits). In some implementations, for the midamble the known TSC bits can be fed back instead of the midamble hard decisions. With this available entire burst, in the preferred embodiment either all or a portion of that burst, using bits in lieu of or in addition to part or all of the midamble, the channel and interference estimates are again determined and the SAIC algorithm is once again applied, but here with respect to a different set and possibly a greater number of bits than were used when switch 46 was in its upward position. These additional steps are further detailed below.

To understand the channel estimation and interference estimation when switch 46 is in its downward position, in general note that the 2-dimensional signal sample vector, $r_m$, at time m, can be written as shown in the following Equation 2:

$$r_m = \sum_{l=0}^{L} h_l a_{m-l} + v_m \quad \text{Equation 2}$$

In Equation 2, $\{a_m\}$ and $v_m$ are the BPSK-modulated transmitted symbol at time m and the interference-plus-noise vector at time m, respectively. The (L+1) tap channel vector is given by $\{h_L\}_{l=1}^{L}$. Next, given a set of N symbols, an SU-LS channel estimation can be performed by channel estimator 42 with respect to those symbols. More particularly in the preferred ebodiment, the N symbols are those chosen from the output of equalizer 30 and returned by switch 46 to SAIC algorithm block 40 and channel estimator 42. Thus, in one approach all 114 data bits plus the 26 bits of the midamble and the 2 flag bits may be sed, in which case N=142. In other approaches a subset of these 142 bits may be used, although preferably they should be consecutive bits in time from the 142 bit sequence. The 6 tail bits on either side of the data bits can also be used for a total of 148 bits. In any event, with those N bits, the SU-LS channel estimation can be performed based on the following Equation 3:

$$\begin{bmatrix} r_L \\ r_{L+1} \\ \vdots \\ r_N \end{bmatrix} = \left( \begin{bmatrix} a_L & a_{L+1} & \cdots & a_0 \\ a_{L+1} & a_L & \cdots & a_1 \\ \vdots & \vdots & \ddots & \vdots \\ a_N & a_{N-1} & \cdots & a_{N-L} \end{bmatrix} \otimes I_{2Q} \right) \begin{bmatrix} h_0 \\ h_1 \\ \vdots \\ h_L \end{bmatrix} + \begin{bmatrix} v_L \\ v_{L+1} \\ \vdots \\ v_N \end{bmatrix} \quad \text{Equation 3}$$

Re-written in matrix form, Equation 3 may be written as shown the in following Equation 4:

$$r = (A \otimes I_{2Q})h + v \quad \text{Equation 4}$$

In Equation 4, $I_{2Q}$ is the identity matrix of dimension 2Q. Further, since the covariance matrix of v is unknown, the least-square estimate of h is derived assuming v is white, as shown in the following Equation 5:

$$\hat{h} = (A \otimes I_{2Q})^\dagger r = (A^\dagger \otimes I_{2Q})r \quad \text{Equation 5}$$

where superscript † indicates pseudo-inverse as shown in the following Equation 6:

$$(A^\dagger = (A^H A)^{-1} A^H) \quad \text{Equation 6}$$

Given the preceding, recall from above that when switch 46 is in its upward position, a correlation with the center 16 (or 26) symbols of the training sequence may be used for the channel estimation; however, in contrast, with switch 46 in its downward position, thereby providing more bits than in the training sequence to channel estimator 42, then in the preferred embodiment a correlation is not used for the channel estimate because the additional symbols, beyond those in the midamble, do not have the same favorable autocorrelation as do the midamble symbols. Thus, in the preferred embodiment and when switch 46 in its downward position, then the least square method of Equation 5 is used for the channel estimate of channel estimator 42.

Lastly, by re-arranging Equation 2 and solving for the noise estimate, when switch 46 is in its downward position, the interference estimate is as obtained as shown in the following Equation 7:

$$\hat{v}_m = r_m - \sum_{l=0}^{L} h_l a_{m-1}, m = 1, 2, \ldots, N \qquad \text{Equation 7}$$

The result of $\hat{v}_m$ is used to derive signal-to-interference-noise ratio ("SINR") interference suppression filters or space-time whitening transformation so as to perform interference cancellation using SAIC algorithm block 40.

From the preceding, note that when switch 46 is in its downward position, channel estimation and interference estimation are performed with respect to a set of symbols (from soft or hard decision of up to an entire burst) that differs at least in part from the set of symbols (i.e., part or all of the TSC) used to perform channel estimation and interference estimation when switch 46 is in its upward position, but where for one succession of switch 46 upward followed by switch 46 downward, both sets of symbols are taken from the same GSM burst sample set. Thus, when switch 46 is upward, following the operation of blocks 40, 42, 44, and equalizer 30, a first set of tentative decisions (preferably hard) are determined, but thereafter switch 46 is downward and new channel estimation and interference estimation are performed, followed again by whitening and the operation of channel estimate SAIC block 44 and equalizer 30 but now with respect to the newly-determined channel and interference estimates. Accordingly, the input to equalizer 30 is further refined when switch 46 is downward and, hence, the accuracy of the soft decisions then output by equalizer 30 are improved. Further, note that in one preferred embodiment only two iterations are required with respect to the symbols sampled as $r_m$ from a GSM burst, the first with switch 46 upward and the second with switch 46 downward. However, additional accuracy may be provided by one or more additional iterations with switch 46 downward for the symbols taken from the same GSM burst. Of course, at some point, and perhaps with only a single iteration wherein switch 46 is downward, a point of diminishing returns will be realized.

From the above, it may be appreciated that the preferred embodiments provide an improved single-antenna interference cancellation receiver, for use by way of example in a GSM communication system. These embodiments include various aspects and advantages as compared to the prior art, as discussed above and as may be appreciated by one skilled in the art. Moreover, while the preferred embodiments have been shown by way of example, certain other alternatives have been provided and still others are contemplated. For example, when switch 46 is switched downward for a second (and possibly additional) iteration for the same sampled group of time-slotted symbols (e.g., of a GSM burst), rather than using tentative hard symbol decisions from equalizer 30 in an alternative preferred embodiment soft tentative decisions may be generated with some other non-linear function such has hyperbolic tangent ("tan h") or linear clipping. As another example, when switch 46 is switched upward for the first iteration to be followed by an additional (or multiple) iteration with switch 46 downward, the SAIC algorithm may be skipped and just the conventional matched filter is applied. As yet another alternative, while the preferred embodiments have been described in connection with a group of time-slotted symbols in the example of GSM TDMA, other embodiments may apply to other time-slotted symbols, such as in EDGE where the desired signal can be either GMSK or 8PSK-modulated (i.e., 3 bits/symbol). When the desired signal is 8PSK-modulated, $r_m$ is a Q-dimensional signal vector and derotation then may be performed using $3\pi/8$ instead of $\pi/2$. Another difference is $r_m$ is complex-valued for 8PSK, where it is real-valued for GMSK. Thus, the equalizer and decision device need to be modified accordingly. Still other examples may be ascertained by one skilled in the art. Thus, the preceding discussion and these examples should further demonstrate that while the present embodiments have been described in detail, various substitutions, modifications or alterations could be made to the descriptions set forth above without departing from the inventive scope which is defined by the following claims.

The invention claimed is:

1. A receiver for use in a modulated communications system wherein data is communicated in a time-slotted format and is subject to channel effects and co-channel interference, the receiver comprising:
   circuitry for providing samples of a group of data from the time-slotted format;
   circuitry for determining a first set of channel estimates in response to a first set of the samples, the first set of channel estimates relating to the channel effects;
   circuitry for determining a first set of interference estimates in response to the first set of the samples and the first set of channel estimates, the first set of interference estimates relating to the co-channel interference;
   circuitry for first predicting decisions for data in the group of data in response to the first set of channel estimates and the first set of interference estimates;
   circuitry for determining a second set of channel estimates in response to the predicted decisions and without a correlation to a training sequence, the second set of channel estimates relating to the channel effects;
   circuitry for determining a second set of interference estimates in response to the predicted decisions and the second set of channel estimates, the second set of interference estimates relating to the co-channel interference; and
   wherein the circuitry for predicting is further for second predicting decisions for data in the group of data in response to the second set of channel estimates and the second set of interference estimates.

2. The receiver of claim 1 and further comprising circuitry for performing single-antenna interference cancellation on the samples, wherein the circuitry for first and second predicting decisions for data in the group of data is further responsive to the single-antenna interference cancellation.

3. The receiver of claim 2 wherein the single-antenna interference cancellation comprises spatial whitening.

4. The receiver of claim 1 wherein the circuitry for first predicting decisions for data in the group of data in response to the first set of channel estimates and a first set of interference estimates comprises circuitry for predicting hard decisions.

5. The receiver of claim 1 wherein the circuitry for first predicting decisions for data in the group of data in response to the first set of channel estimates and a first set of interference estimates comprises circuitry for predicting soft decisions.

6. The receiver of claim 1 wherein the circuitry for first predicting decisions for data in the group of data in response to the first set of channel estimates and a first set of interference estimates comprises circuitry for predicting soft decisions in response to a function selected from a group consisting of a non-linear function and linear clipping.

7. The receiver of claim 1 wherein the circuitry for determining a first set of channel estimates and a first set of interference estimates in response to a first set of the samples is for determining the first set of channel estimates and the first set of interference estimates in response to at least a portion of a training sequence code.

8. The receiver of claim 7 wherein the training sequence code comprises a GSM training sequence code.

9. The receiver of claim 7:
wherein the training sequence code comprises a GSM training sequence code; and
wherein the circuitry for determining a first set of channel estimates and a first set of interference estimates in response to a first set of the samples is for determining the first set of channel estimates and the first set of interference estimates in response to an entirety of the training sequence code.

10. The receiver of claim 7:
wherein the training sequence code comprises a GSM training sequence code; and
wherein the circuitry for determining a first set of channel estimates and a first set of interference estimates in response to a first set of the samples is for determining the first set of channel estimates and the first set of interference estimates in response to a portion of the training sequence code.

11. The receiver of claim 1:
wherein the circuitry for determining the first set of channel estimates and the first set of interference estimates comprises correlation circuitry; and
wherein the circuitry for determining the second set of channel estimates and the second set of interference estimates comprises single user least squares circuitry.

12. The receiver of claim 1:
wherein the circuitry for determining the first set of channel estimates and the first set of interference estimates comprises single user least squares circuitry; and
wherein the circuitry for determining the second set of channel estimates and the second set of interference estimates comprises single user least squares circuitry.

13. The receiver of claim 1 wherein the circuitry for predicting is selected from a set consisting of an equalizer, a maximum likelihood sequence estimator, an interference canceller, and a matched filter.

14. The receiver of claim 1 wherein the circuitry for providing samples comprises:
a sampler for sampling an incoming signal at a rate Q greater than a sample rate and to provide a discrete-time output;
a de-rotater for applying de-rotation to the discrete time sequence;
circuitry for extracting a real component for each input sample; and
circuitry for extracting an imaginary component for each input sample.

15. The receiver of claim 1 and further comprising:
a deinterleaver coupled to receive decisions predicted by the circuitry for predicting second predicting decisions;
a decoder coupled to receive an output of the deinterleaver; and
a cyclic redundancy check circuit for evaluating cyclic redundancy check accuracy of at least a portion of data output by the decoder.

16. The receiver of claim 1 wherein the circuitry for first predicting decisions for data in the group of data in response to the first set of channel estimates comprises circuitry for predicting hard decisions.

17. The receiver of claim 1 wherein the circuitry for first predicting decisions for data in the group of data in response to the first set of channel estimates comprises circuitry for predicting soft decisions.

18. The receiver of claim 1 wherein the circuitry for providing samples comprises:
a sampler for sampling an incoming signal at a rate Q greater than a sample rate and to provide a discrete-time output;
a de-rotater for applying de-rotation to the discrete time sequence;
circuitry for extracting a real component for each input sample; and
circuitry for extracting an imaginary component for each input sample.

19. The receiver of claim 18 and further comprising:
a deinterleaver coupled to receive decisions predicted by the circuitry for predicting second predicting decisions;
a decoder coupled to receive an output of the deinterleaver; and
a cyclic redundancy check circuit for evaluating cyclic redundancy check accuracy of at least a portion of data output by the decoder.

20. The receiver of claim 1 wherein the modulation is selected from a set consisting of GMSK and 8PSK modulation.

21. A method of operating a receiver in a wireless modulated communications system wherein data is communicated in a time-slotted format and is subject to channel effects and co-channel interference, the method comprising:
receiving communications in the time-slotted format;
providing samples of a group of data from the time-slotted format;
first, determining a first set of channel estimates in response to a first set of the samples, the first set of channel estimates relating to the channel effects;
second, determining a first set of interference estimates in response to the first set of the samples and the first set of channel estimates, the first set of interference estimates relating to the co-channel interference;
third, predicting decisions for data in the group of data in response to the first set of channel estimates and the first set of interference estimates;
fourth, determining a second set of channel estimates in response to the predicted decisions and without a correlation to a training sequence;
fifth, determining a second set of interference estimates in response to the predicted decisions and the second set of channel estimates, the second set of interference estimates relating to the co-channel interference; and
sixth, predicting decisions for data in the group of data in response to the second set of channel estimates and the second set of interference estimates.

22. The method of claim 21 and further comprising performing single-antenna interference cancellation on the samples, wherein the steps of first and second predicting decisions for data in the group of data are further responsive to the single-antenna interference cancellation.

23. The method of claim 22 wherein the single-antenna interference cancellation comprises spatial whitening.

24. The method of claim 21 wherein the step of first predicting decisions for data in the group of data in response to the first set of channel estimates and a first set of interference estimates comprises predicting hard decisions.

25. The method of claim 21 wherein the step of first predicting decisions for data in the group of data in response to the first set of channel estimates and a first set of interference estimates comprises predicting soft decisions.

26. The method of claim 21 wherein the steps of determining a first set of channel estimates and a first set of interference estimates in response to a first set of the samples comprise determining the first set of channel estimates and the first set of interference estimates in response to at least a portion of a training sequence code.

27. The method of claim 21 wherein the data comprises a GSM data.

* * * * *